US012447843B2

(12) United States Patent
Yamada et al.

(10) Patent No.: US 12,447,843 B2
(45) Date of Patent: Oct. 21, 2025

(54) INFORMATION TRANSMISSION DEVICE

(71) Applicant: TOYOTA JIDOSHA KABUSHIKI KAISHA, Toyota (JP)

(72) Inventors: Kenichi Yamada, Nisshin (JP); Toshiki Kashiwakura, Tokyo (JP); Akane Umezu, Nagoya (JP); Kayo Tsumoto, Nisshin (JP); Yuta Shishime, Tokyo (JP); Satoshi Komamine, Nagoya (JP); Kenji Ishiyama, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/486,366

(22) Filed: Oct. 13, 2023

(65) Prior Publication Data

US 2024/0208345 A1    Jun. 27, 2024

(30) Foreign Application Priority Data

Dec. 23, 2022  (JP) ................................. 2022-207185

(51) Int. Cl.
*B60L 53/30*       (2019.01)
*B60L 53/66*       (2019.01)

(52) U.S. Cl.
CPC ............. *B60L 53/305* (2019.02); *B60L 53/66* (2019.02)

(58) Field of Classification Search
CPC ............................... B60L 53/305; B60L 53/66
USPC ...................................................... 340/425.5
See application file for complete search history.

(56) References Cited

U.S. PATENT DOCUMENTS

| 11,447,024 | B1* | 9/2022 | Brannan | B60L 53/665 |
| 2012/0005125 | A1* | 1/2012 | Jammer | B60L 53/64 |
| | | | | 705/412 |
| 2012/0271758 | A1* | 10/2012 | Jammer | G07F 15/003 |
| | | | | 701/22 |
| 2015/0095233 | A1* | 4/2015 | Wild | G06Q 30/04 |
| | | | | 705/44 |
| 2015/0149221 | A1* | 5/2015 | Tremblay | B60L 53/665 |
| | | | | 320/109 |
| 2020/0006969 | A1* | 1/2020 | Penilla | H04L 67/04 |
| 2020/0031239 | A1* | 1/2020 | Chae | G08G 1/20 |
| 2020/0177026 | A1* | 6/2020 | Sosinov | B60L 53/124 |
| 2021/0025728 | A1* | 1/2021 | Thum | G01C 21/3664 |
| 2022/0024330 | A1* | 1/2022 | Books | G06Q 10/06315 |
| 2022/0105825 | A1 | 4/2022 | Nishida | |
| 2022/0169134 | A1* | 6/2022 | Xu | G06Q 10/06 |
| 2023/0339345 | A1* | 10/2023 | Yao | B60L 53/305 |

FOREIGN PATENT DOCUMENTS

| JP | 2021-121885 A | 8/2021 |
| WO | 2020/153107 A1 | 7/2020 |

* cited by examiner

*Primary Examiner* — Zhen Y Wu
(74) *Attorney, Agent, or Firm* — SoraIP, Inc.

(57) ABSTRACT

The information transmission device includes a communication unit and a control unit. The communication unit receives position information indicating the current position of the power supply vehicle from at least one of the power supply vehicle and the general vehicle when the power supply vehicle moves to the position of the general vehicle and charges the general vehicle. The control unit generates display information based on the received position information, and causes the communication unit to transmit the display information to one or more information terminals.

4 Claims, 5 Drawing Sheets

INFORMATION TRANSMISSION DEVICE

CROSS-REFERENCE TO RELATED APPLICATION

This application claims priority to Japanese Patent Application No. 2022-207185 filed on Dec. 23, 2022, incorporated herein by reference in its entirety.

BACKGROUND

1. Technical Field

The present disclosure relates to an information transmission device that transmits information regarding a power supply vehicle that is supplying power.

2. Description of Related Art

There is proposed a system in which a charging service provided by a business operator is reserved when a battery charge amount becomes equal to or less than a predetermined value in a vehicle traveling by using electricity as a power source (see, for example, Japanese Unexamined Patent Application Publication No. 2021-121885 (JP 2021-121885 A)). In the service according to the related art, a power supply vehicle of the business operator goes to a location of a vehicle requiring charging, and a worker of the power supply vehicle inserts a charging plug into a charging port of the charging target vehicle to charge a battery. According to the related art, it is possible to cause a third party to charge the battery of the vehicle even while a user is away from the vehicle.

SUMMARY

However, when a power supply vehicle is parked on a street or the like in a general residential area and power is being supplied to vehicles of residents, residents in the neighborhood may feel distrust and anxiety.

An object of the present disclosure made in view of such circumstances is to provide an information transmission device that transmits information that gives the residents in the neighborhood a sense of security when the power supply vehicle is supplying power.

An information transmission device according to an embodiment of the present disclosure for solving the above issue includes:
- a communication unit that receives, when a power supply vehicle moves to a general vehicle and charges the general vehicle, position information indicating a current position of the power supply vehicle from at least one of the power supply vehicle and the general vehicle; and
- a control unit that generates display information based on the position information that has been received, and causes the communication unit to transmit the display information to one or more information terminals.

According to the present disclosure, it is possible to give the residents in the neighborhood a sense of security about the power supply vehicle that is supplying power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings. Note that the drawings used in the following description are schematic. The dimensions, ratios, etc. on the drawings do not necessarily match the actual ones.

(Overall System Configuration)

Figure 1:
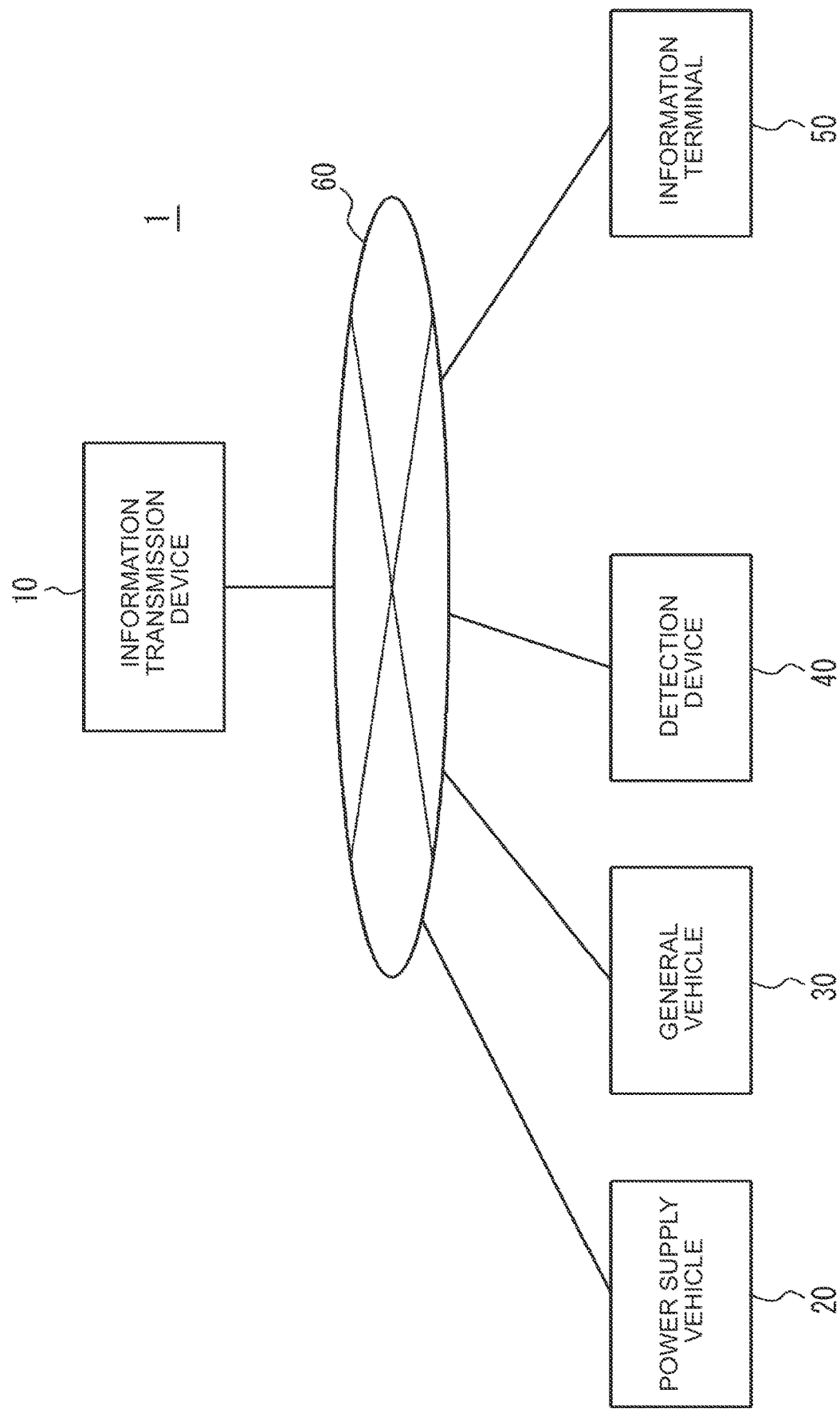
FIG. 1 is a block diagram showing a schematic configuration of a system including an information transmission device according to one embodiment of the present disclosure.

FIG. 1 is a diagram showing a schematic configuration of a system 1 including an information transmission device 10 that provides an information terminal 50 with information on a power supply vehicle 20 during power supply. The system 1 includes an information transmission device 10, a power supply vehicle 20, a general vehicle 30, a detection device 40, an information terminal 50, and a network 60 that connects these components so that they can communicate with each other. Note that the detection device 40 is not an essential component. A plurality of power supply vehicles 20, general vehicles 30, detection devices 40, and information terminals 50 may exist.

The information transmission device 10 is a computer operated by an operator or a public institution that provides the information terminal 50 with information on the power supply vehicle 20. Computers include server PCs (Personal Computers), workstations, minicomputers, and the like. The information transmission device 10 acquires information including position information indicating the current position of the power supply vehicle 20 from the power supply vehicle 20, the general vehicle 30, and the detection device 40. The information transmission device 10 generates display information based on the acquired information. The information transmission device 10 transmits display information to the information terminal 50 so as to be displayed on the display of the information terminal 50. The information transmission device 10 transmits information by an appropriate method corresponding to the type of each information terminal 50 and the application installed in the information terminal 50. The information transmission device 10 can cope with both push-type information transmission for actively transmitting information when information is updated and pull-type information transmission for transmitting information in response to an information transmission request from an information terminal 50.

The power supply vehicle 20 is a vehicle that is equipped with a battery or a generator, moves to a place where the general vehicle 30 is parked in response to a request from a user of the general vehicle 30, and provides a charging service to the parked general vehicle 30. In the following description, it is assumed that the power supply vehicle 20 is equipped with a battery. The power supply vehicle 20 can transmit position information indicating the current position of the own vehicle to the information transmission device 10 while power is being supplied to the general vehicle 30. The power supply vehicle 20 can further transmit information such as the remaining time until the end of power supply and the contact information of the business operator that operates the power supply vehicle 20 to the information transmission device 10.

The general vehicle 30 is an externally chargeable electrified vehicle including a battery electric vehicle (BEV), a plug-in hybrid electric vehicle (PHEV), and the like. The general vehicle 30 is a vehicle other than the power supply vehicle 20 and includes privately owned vehicles and commercial vehicles. The general vehicle 30 can transmit the current position of the own vehicle to the information transmission device 10 while being charged by the power supply vehicle 20. Since the general vehicle 30 is positioned close to the power supply vehicle 20 during charging, the current position of the general vehicle 30 can be regarded as the current position of the power supply vehicle 20 if an error of about the size of the vehicle 30 is allowed.

The detection device 40 is a sensor that is placed on roads and parking lots in the city and monitors the roads and their surroundings. The detection device 40 can detect the position of the power supply vehicle 20. The detection device 40 may be a camera whose imaging range is the road and/or the parking lot. The information transmission device 10 is configured to be able to acquire sensor information detected by the detection device 40. When the detection device 40 is a camera, the sensor information is image information captured by the camera. The information transmission device 10 can request the detection device 40 positioned around the power supply vehicle 20 to transmit the acquired sensor information.

The information terminal 50 is a terminal having a display for displaying information. The information terminal 50 includes a mobile information terminal such as a smartphone owned by a general person, a navigation system mounted on a vehicle, an information display device that displays information for pedestrians in the area, and a kiosk terminal that can search for nearby information in the city. The mobile information terminal and the navigation system are loaded with an application corresponding to the information provided by the information transmission device 10. The information transmission device 10 transmits display information to the information terminal 50 on which the application is activated.

(Configuration of Information Transmission Device)

Figure 2:
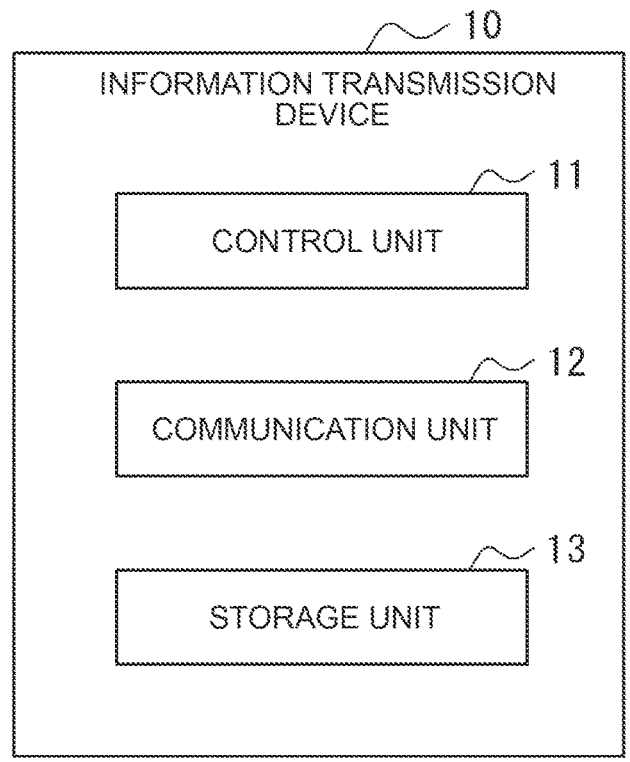
FIG. 2 is a block diagram showing a schematic configuration of the information transmission device of FIG. 1.

The information transmission device 10 includes a control unit 11, a communication unit 12, and a storage unit 13, as shown in FIG. 2.

Control unit 11 includes at least one processor, at least one dedicated circuit, or a combination thereof. A processor may be a general-purpose processor, such as a Central Processing Unit (CPU), or a dedicated processor specialized for a particular process. The control unit 11 executes processing related to the operation of the information transmission device 10 while controlling each unit of the information transmission device 10. In the following, processing executed by the control unit 11 may be described as processing executed by the information transmission device 10. For example, the control unit 11 using the communication unit 12 to transmit information to the outside may be described as the information transmission device 10 transmitting the information to the outside. The control unit 11 executes the processing of the information transmission device 10 described in the flowchart of FIG. 6 described later according to the program.

The communication unit 12 includes at least one external communication interface that connects to the network 60. The external communication interface may be either a wired communication interface or a wireless communication interface. The communication unit 12 receives information for processing by the information transmission device 10 from the outside (for example, the power supply vehicle 20, the general vehicle 30, and the detection device 40), and transmits the information obtained as a result of processing by the information transmission device 10 to the outside (for example, the information terminal 50).

The storage unit 13 includes at least one semiconductor memory, at least one magnetic memory, at least one optical memory, or a combination of at least two of these. The storage unit 13 functions as, for example, a main storage device, an auxiliary storage device, or a cache memory. The storage unit 13 stores programs and data used for the operation of the information transmission device 10 and data obtained by the operation of the information transmission device 10. The information stored in the storage unit 13 may be updateable with information obtained from the network 60 via the communication unit 12, for example.

The information transmission device 10 of this embodiment may further include an input unit and an output unit. That is, in addition to receiving (inputting) and transmitting (outputting) information via the communication unit 12, the information transmission device 10 may input and output information through the input unit and the output unit. The input unit includes, for example, a keyboard, a mouse, and a microphone for voice input. The output unit includes, for example, a display and a speaker.

(Configuration of Power Supply Vehicle and General Vehicle)

Figure 3:
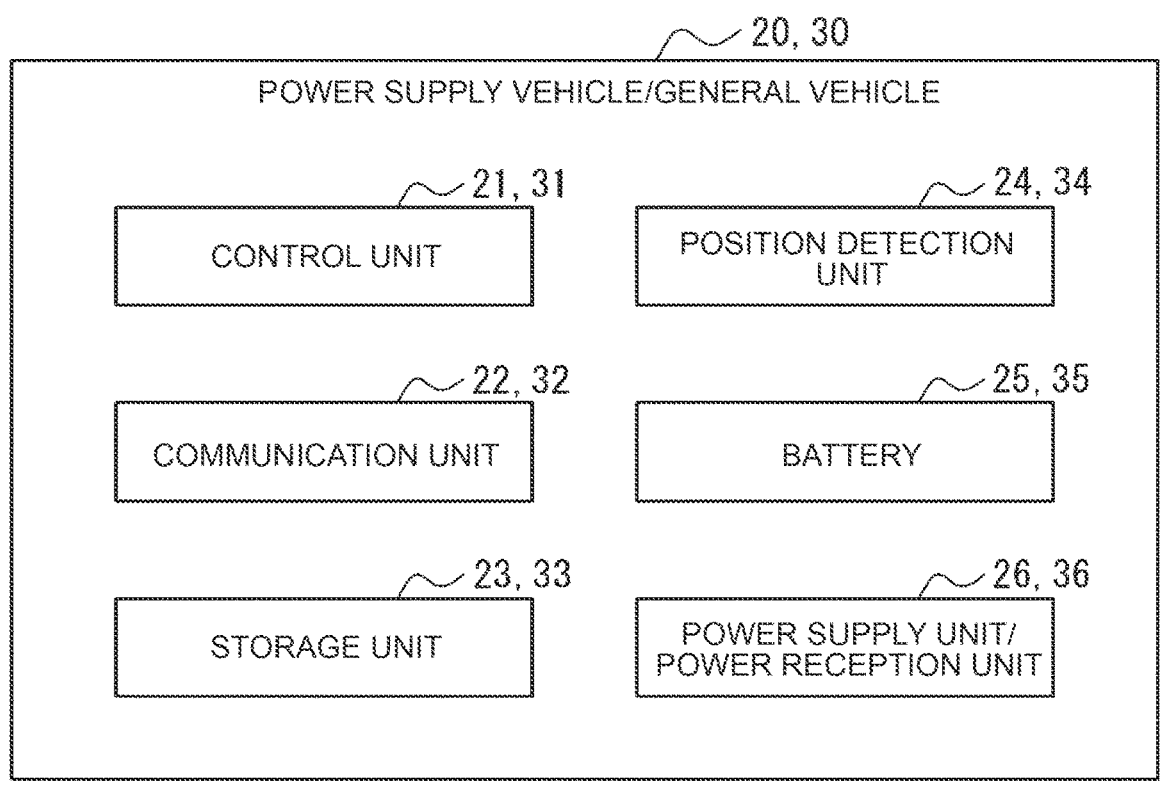
FIG. 3 is a block diagram showing a schematic configuration of the power supply vehicle and general vehicle of FIG. 1.

Configurations of power supply vehicle 20 and general vehicle 30 will be described with reference to FIG. 3. Power supply vehicle 20 includes control unit 21, communication unit 22, storage unit 23, position detection unit 24, battery 25 and power supply unit 26. General vehicle 30 includes control unit 31, communication unit 32, storage unit 33, position detection unit 34, battery 35 and power reception unit 36. Since the power supply vehicle 20 and the general vehicle 30 have common components, they will be described using the same drawings. However, both are different in that the power supply vehicle 20 has the power supply unit 26 and the general vehicle 30 has the power reception unit 36.

The control units 21 and 31, like the control unit 11 of the information transmission device 10, include at least one processor, at least one dedicated circuit, or a combination thereof. The control units 21 and 31 control the entirety of the power supply vehicle 20 and the general vehicle 30, respectively. The control units 21 and 31 can transmit current position information detected by the position detection units 24 and 34 to the information transmission device 10 via the communication units 22 and 32. The transmission of this location information is continuously performed at predetermined intervals.

The communication units 22 and 32 are components that execute communication processing of the power supply vehicle 20 and the general vehicle 30. The communication units 22 and 32 include at least one external communication interface that connects to the network 60. The external communication interface is, for example, an interface compatible with mobile communication standards such as LTE, 4G, or 5G. The communication units 22 and 32 receive data used for the operation of the power supply vehicle 20 and the general vehicle 30, respectively, and transmit data obtained by the operation of the power supply vehicle 20 and the general vehicle 30 to the outside (for example, the information transmission device 10).

Storage units 23 and 33 include one or more memories, similar to storage unit 13 of information transmission device 10. The storage units 23 and 33 store arbitrary information used for the operation of the power supply vehicle 20 and the general vehicle 30, respectively.

The position detection units 24 and 34 acquire the current positions of the power supply vehicle 20 and the general vehicle 30, respectively. The current position may be absolute position information represented by latitude and longitude. The position detection units 24 and 34 include, for example, receivers compatible with the Global Positioning System (GPS), but are not limited to this, and may include receivers compatible with any satellite positioning system.

The batteries 25 and 35 include, for example, secondary batteries that can be repeatedly charged and discharged, such as lithium-ion secondary batteries or nickel-metal hydride secondary batteries. Electric power supply vehicle 20 and general vehicle 30 may employ other power storage devices such as multilayer capacitors instead of secondary batteries. Batteries 25, 35 include control circuitry that controls current, voltage, temperature, and the like. A control circuit for the batteries 25 and 35 can acquire the remaining battery level of the battery 35 of the general vehicle 30. The control units 21 and 31 can estimate the time until charging of the battery 35 of the general vehicle 30 is completed based on signals from the control circuits of the batteries 25 and 35 during power supply. The power supply vehicle 20 may have a large battery 25 mounted in the rear portion of the vehicle or the like. The battery 35 of the general vehicle 30 may be arranged at any place inside the general vehicle 30, such as under the rear seat of the general vehicle 30 or in the luggage compartment.

The power supply unit 26 is a portion that supplies electric power from the battery 25 to the general vehicle 30. Power supply unit 26 includes a charging cable 26a and a connector 26b provided at the tip of charging cable 26a.

The power reception unit 36 is supplied with power from the outside in order to charge the battery 35. Power reception unit 36 includes a charging port 36a. Charging port 36a includes a charging inlet that connects connector 26b of charging cable 26a from power supply vehicle 20. The charging port 36a may be arranged at any position such as the upper portion of the front grill of the general vehicle 30, the front fender, the rear fender, the rear bumper, or the like.

Figure 4:
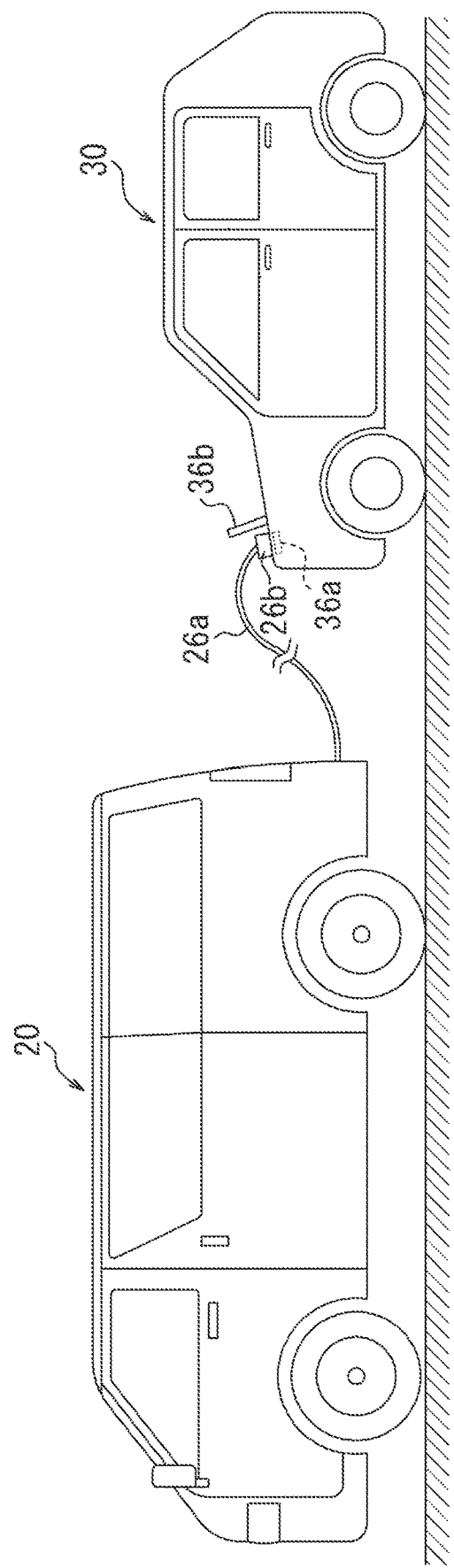
FIG. 4 is a diagram showing a state in which the general vehicle of FIG. 1 is charged by a power supply vehicle.

FIG. 4 shows an example of a form in which the power supply vehicle 20 charges the general vehicle 30. In this example, the charging port 36a of the general vehicle 30 is arranged above the front grill of the general vehicle 30. Power supply vehicle 20 is connected to general vehicle 30 via charging cable 26a. Therefore, the power supply vehicle 20 that is being supplied with power needs to be parked near the general vehicle 30. When the general vehicle 30 is parked in a residential parking lot, the power supply vehicle 20 often has to park on the road near the general vehicle 30.

(Display on Information Terminal)

The information terminal 50 has a control unit, a communication unit, and a display. The control unit manages the information terminal 50 as a whole. The communication unit communicates with the information transmission device 10 and other external devices. The display displays display information acquired from the information transmission device 10 via the communication unit. The display is, for example, an LCD or an organic EL display, but is not limited to these. The display may be a touch panel that also serves as an input unit. The control unit of the information terminal 50 may process the display information acquired from the information transmission device 10 and display it on the display.

If the information terminal 50 is a personal portable information terminal or a navigation system, the information terminal 50 is loaded with a dedicated application. The control unit of the information terminal 50 may transmit the current position of the information terminal 50 to the information transmission device 10 by a function programmed in the application. Thereby, the information transmission device 10 can store and manage the current position of the information terminal 50 in the storage unit 13. The information terminal 50 may request the latest information from the information transmission device 10 when necessary or at appropriate intervals, depending on the application. The information terminal 50 may be set by an application to receive the latest information when the information transmission device 10 updates the information.

If the information terminal 50 is an information display device that displays information for pedestrians in the area, or a kiosk terminal that can search for nearby information in the city, the location of these information terminals 50 may be registered in the information transmission device 10 in advance and stored in the storage unit 13 of the information transmission device 10. Information displayed on the display by the information terminal 50 may be constantly updated by information transmitted from the information transmission device 10.

The information transmission device 10 generates display information for displaying the position of the power supply vehicle 20 based on the position information of the power supply vehicle 20 acquired from the power supply vehicle 20 and the general vehicle 30. The display information is generated, for example, as map information for displaying the power supply vehicle 20 on a map, as shown in FIG. 5.

Figure 5:
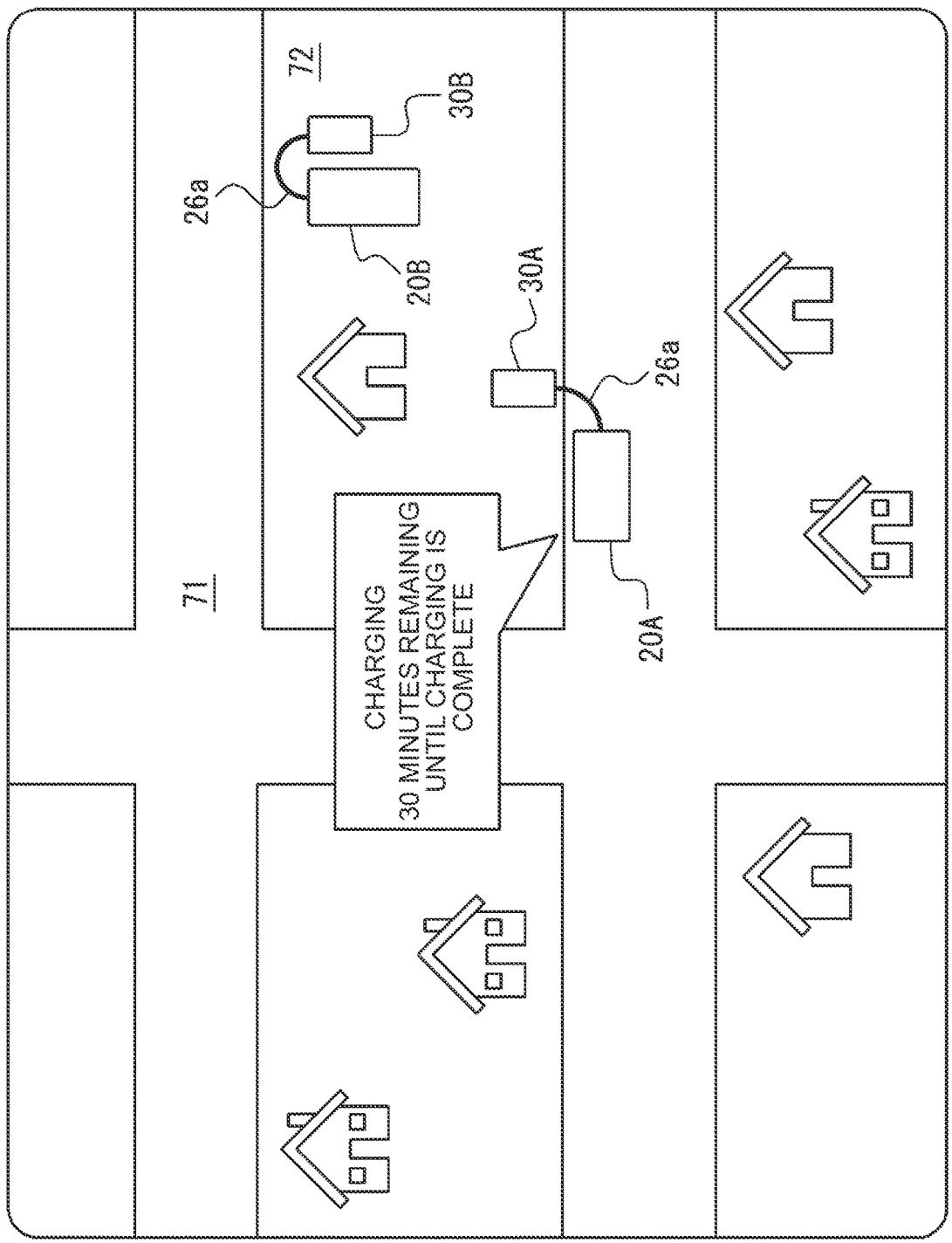
FIG. 5 is a diagram showing an example of display on the display of the information terminal.

In FIG. 5, the power supply vehicle 20 is indicated with reference numerals 20A and 20B. In addition, general vehicles 30 are denoted by reference numerals 30A and 30B. The image actually displayed on the display of the information terminal 50 may not have these indications. Also, the images of the general vehicles 30A and 30B may not be included in the display information.

The display information may include information on the remaining time until charging is completed, which is acquired from the power supply vehicle 20. By including the remaining time in the display information, it is possible to notify nearby residents who see the information terminal 50 of the end time of charging, so that they can feel more secure.

In addition, the information transmission device 10 may transmit other information about the power supply vehicle 20 by including it in the display information or adding it to the display information. The information on the power supply vehicle 20 may include information on the name and contact information of the business operator that operates the power supply vehicle 20. By doing so, when the power supply vehicle 20 is obstructing traffic, a nearby resident who sees the displayed information on the information terminal 50 can contact the business operator.

When the position information of power supply vehicle 20 is detected based on a satellite positioning system such as GPS, the position information may contain a certain amount of measurement error. Furthermore, if the current position of power supply vehicle 20 is considered to be the same as the positional information of general vehicle 30 receiving power from power supply vehicle 20, a larger positional error is included. Therefore, information transmission device 10 can correct the position information of power supply vehicle 20 to a more accurate position based on the detection information detected by detection devices 40 around power supply vehicle 20. For example, if the detection device 40 is a camera, the information transmission device 10 can recognize an accurate positional relationship between the power supply vehicle 20 and the road 71 by analyzing the camera image. For example, the information transmission device 10 can identify whether the power supply vehicle 20B is parked within the residential site 72 or parked outside the road 71.

The information transmission device 10 does not have to include a specific power supply vehicle 20 in the display information according to the positional relationship between the power supply vehicle 20 and the surrounding road 71. For example, the information transmission device 10 stores map information including information on the road width of the road 71 in the storage unit 13. Based on the map information stored in the storage unit 13, the information transmission device 10 may exclude the power supply vehicle 20 from the display information when the power supply vehicle 20 is located on the road 71 having a width equal to or greater than a predetermined value. Further, the information transmission device 10 may exclude the power supply vehicle 20 (for example, the power supply vehicle 20B) located entirely within the individual's residential site 72 from the display information. By doing so, it is possible to prevent the information terminal 50 from displaying the power supply vehicle 20 that does not interfere with traffic.

The information transmission device 10 transmits display information about the power supply vehicles 20 around each information terminal 50 based on the position information of each information terminal 50. For example, the information transmission device 10 transmits to each information terminal 50 display information including the power supply vehicles 20 within a predetermined distance range from the position of each information terminal 50. In this case, when viewed from the power supply vehicle 20, the information transmission device 10 transmits display information including the power supply vehicle 20 to the information terminal 50 located within a specific area within a predetermined distance range from the power supply vehicle 20.

Further, when the information terminal 50 is an information display device that displays information for pedestrians in the area, the information terminal 50 may display information for each administrative district. In that case, the information of the power supply vehicle 20 is displayed on the information terminal 50 within the administrative area including the current position of the power supply vehicle 20. The information transmission device 10 transmits the display information of the specific power supply vehicle 20 to one or more information terminals 50 in a predetermined area including the current position of the specific power supply vehicle 20 without being limited to the above method. In this way, the information on the power supply vehicle 20 can be displayed on the information terminals 50 in the neighboring areas that require the information on the power supply vehicle 20.

(Information Transmission Method by Information Transmission Device)

Next, the procedure of the information transmission method executed by the information transmission device 10 will be described with reference to the flowchart of FIG. 6. The method disclosed herein can be executed by a processor included in control unit 11 according to a program. Such a program can be stored in a non-transitory computer-readable medium. Examples of non-transitory computer readable media include, but are not limited to, hard disks, random access memory (RAM), read only memory (ROM), flash memory, compact disc read only memory (CD-ROM), optical storage devices, magnetic storage devices, and the like.

First, the information transmission device 10 acquires the position information of the power supply vehicle 20 from the power supply vehicle 20 and/or the general vehicle 30 during power feeding (S101). The information transmission device 10 individually manages information about one or more power supply vehicles 20 for which position information has been obtained.

The information transmission device 10 acquires information about power supply from the power supply vehicle 20 and/or the general vehicle 30 (S102). The information about power supply may include the remaining time until charging of the general vehicle 30 is completed and the contact information of the business operator that operates the power supply vehicle 20. The information transmission device 10 may simultaneously acquire the information acquired in S101 and the information acquired in S102.

The information transmission device 10 determines whether the width of the road on which each power supply vehicle 20 is parked is equal to or greater than a predetermined value (S103). It is assumed that road width information is pre-stored in the storage unit 13 as part of the map information.

Figure 6:
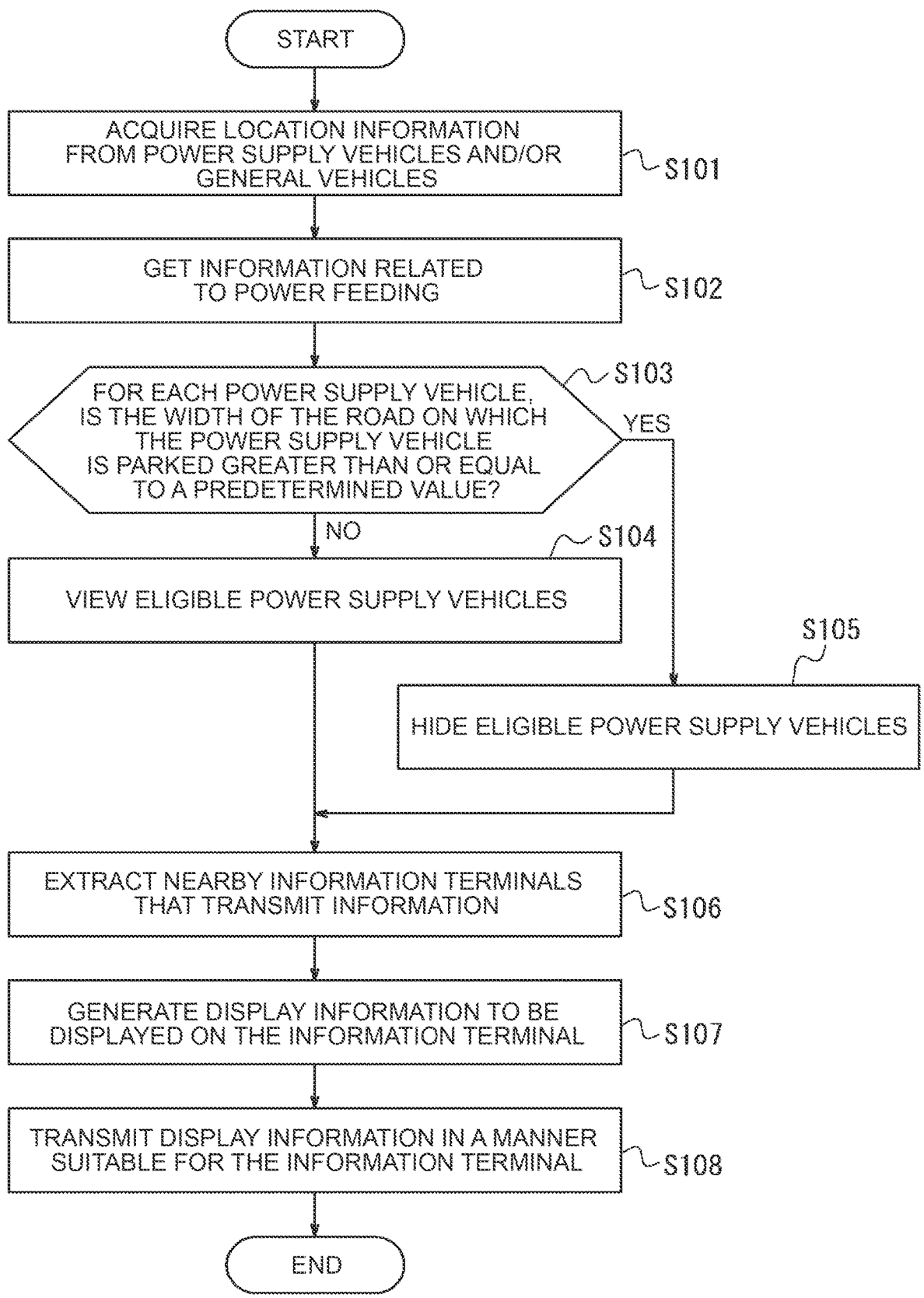
FIG. 6 is a flowchart showing the procedure of information transmission by the information transmission device.

In the example of FIG. 6, when the road width of the parked road is not equal to or greater than the predetermined value (S103: No), the target power supply vehicle 20 is included in the display information (S104). When the road width of the parked road is equal to or greater than the predetermined value (S103: Yes), the target power supply vehicle 20 is excluded from the display targets and is not included in the display information (S105).

Note that S103 to S105 may be omitted. In that case, all the power supply vehicles 20 whose position information is acquired in S101 are displayed.

Next, the information transmission device 10 extracts information terminals 50 located nearby to which information is to be transmitted (S106). Information on the target information terminal 50 is stored in advance in the storage unit 13 together with position information. If the information terminal 50 is a portable information terminal or a navigation system, when the information terminal 50 starts up a dedicated application, the information of the information terminal 50 is notified to the information transmission device 10 and stored in the storage unit 13. Which geographical area of the information terminal 50 to display information on varies depending on the type of the information terminal 50 and its settings.

The information transmission device 10 generates display information to be displayed on the information terminal 50 (S107). The display information may include information indicating the position of the power supply vehicle 20 during power supply, information on the remaining time until charging is completed, and information related to other power supply vehicles 20.

The information transmission device 10 transmits the display information generated in S107 by a method suitable for the information terminal 50 (S108). The information transmission device 10 may transmit information in response to a request from the information terminal 50. The information transmission device 10 may transmit the updated information to the information terminal 50 when the information is updated.

The information of the power supply vehicle 20 is displayed on the display of the information terminal 50 while the power supply vehicle 20 is supplying power. The power supply vehicle 20 notifies the information transmission device 10 when the power supply is completed. By this. The display information of power supply vehicle 20 is erased, and the display of power supply vehicle 20 is erased from the display of information terminal 50.

As described above, according to the present embodiment, it is possible to provide information about the power supply vehicle 20 to nearby residents and the like via the information terminal 50. As a result, it is possible to reduce the anxiety and distrust caused by the parking of a vehicle unknown to residents in the neighborhood.

It should be noted that the present disclosure is not limited to the above-described embodiments, and many modifications and alterations are possible. For example, the functions included in each means, each step, etc. can be rearranged so as not to be logically inconsistent, and a plurality of means, steps, etc. can be combined into one or divided.

What is claimed is:

1. An information transmission device comprising:
   a communication unit that receives, when a power supply vehicle moves to a general vehicle and charges the general vehicle, position information indicating a current position of the power supply vehicle from at least one of the power supply vehicle and the general vehicle;
   a control unit that generates display information based on the position information that has been received, and causes the communication unit to transmit the display information to one or more information terminals; and
   a storage unit for storing map information including road width information, and does not include the power supply vehicle in the display information when the power supply vehicle is located on a road with a road width equal to or greater than a predetermined value.

2. The information transmission device according to claim 1, wherein the control unit further acquires information on the remaining time until charging is completed from at least one of the power supply vehicle and the general vehicle via the communication unit, and includes the information on the remaining time in the display information.

3. The information transmission device according to claim 1, wherein the control unit causes the communication unit to transmit the display information to the one or more information terminals within a predetermined area including the current position of the power supply vehicle.

4. The information transmission device according to claim 1, wherein the control unit acquires detection information detected by a detection device provided on a road via the communication unit, and corrects the position information of the power supply vehicle based on the detection information.

* * * * *